United States Patent [19]

Woosley

[11] Patent Number: 5,605,108
[45] Date of Patent: Feb. 25, 1997

[54] METHOD OF FORMING A VARIABLE DENSITY MOTOR VEHICLE CARPET

[75] Inventor: Robert S. Woosley, Greenville, S.C.

[73] Assignee: JPS Automotive Products Corp., Greenville, S.C.

[21] Appl. No.: 529,562

[22] Filed: Sep. 18, 1995

Related U.S. Application Data

[62] Division of Ser. No. 185,397, Jan. 24, 1994, Pat. No. 5,474,829.

[51] Int. Cl.$^6$ .......................... D05C 15/04; B62D 25/20
[52] U.S. Cl. .................. 112/475.23; 428/88; 428/95; 156/72; 296/97.23; 296/39.1
[58] Field of Search .................. 112/475.08, 475.23, 112/80.01, 80.7, 80.3, 410, 411; 428/88, 89, 92, 95, 96, 85; 264/243, 257; 156/72; 296/39.1, 97.23

[56] References Cited

U.S. PATENT DOCUMENTS

| | | | |
|---|---|---|---|
| 3,953,632 | 4/1976 | Robinson | 428/95 |
| 4,317,419 | 3/1982 | Spanel et al. | 112/475.23 |
| 4,336,289 | 6/1982 | Davis | 428/88 X |
| 4,579,764 | 4/1986 | Peoples, Jr. et al. | 428/95 |
| 4,748,063 | 5/1988 | Reuben | 428/95 X |
| 4,871,602 | 10/1989 | Luker | 428/88 |
| 5,109,784 | 5/1992 | Lepe-Cisneros | 112/475.23 |

*Primary Examiner*—Peter Nerbun
*Attorney, Agent, or Firm*—Henry S. Jaudon

[57] ABSTRACT

The invention is directed to a method of tufting and molding a carpet module which is sized and shaped to fit the interior of a motor vehicle to form its floor carpeting. The method includes tufting the module in such a manner that selected areas have pile tufts arranged at a lower densities than the selected high density area. This construction provides that the selected high density area has the greater resistance to wear and the remaining areas have selected lesser resistance to wear while the entire module maintains substantially a uniform appearance.

18 Claims, 5 Drawing Sheets

METHOD OF FORMING A VARIABLE DENSITY MOTOR VEHICLE CARPET

This is a divisional application of U.S. application Ser. No. 08/185,397, filed Jan. 24, 1994, now U.S. Pat. No. 5,474,829 entitled *Variable Density Motor Vehicle Carpet.*

BACKGROUND OF THE INVENTION

This invention is directed to a molded carpet module shaped to fit the interior of automobiles or other passenger vehicles such as utility vehicles and trucks. The carpet module has been constructed to present the appearance of having uniform pile tufts throughout while at the same time possessing extended wear characteristics in the area subjected to the most wear.

The use of molded carpet modules for carpeting motor vehicle interiors is an old and well established practice as illustrated by U.S. Pat. Nos. 3,953,632 and 4,579,764. These patents are concerned with backing materials and molding features forming the modules. There is no indication in these disclosures that a need exists for providing more wear resistant areas, for reducing the amount of pile yarn by selectively distributing it over the modules, or in fact that such could be done in molded carpet modules.

U.S. Pat. Nos. 4,871,602 and 5,109,784 are directed to floor mats for use in automobiles which have strips in which more pile yarn is tufted into the backing fabric to form an area which is more resistant to wear. These patents are restricted to floor mats which are one dimensional and are intended to cover a portion of the carpeted area adjacent the automobile seat. These floor mats are formed with only a portion of their surface constructed to sustain greater wear. These patents disclose increasing pile content. No indication is made in either disclosure that a molded module of automobile floor carpeting is contemplated, nor is it indicated that a savings of pile yarn is desirable.

Accordingly, it is an object of this invention to provide a method of forming a sized and shaped unitary carpet module designed to fit an interior floor area of a motor vehicle having two or more areas with different wear resistances.

Another object of the invention is to provide a method of tufting pile carpet for a floor area of a motor vehicle which defines front and rear seat areas, and also possibly luggage/cargo compartment areas.

Another object of the invention is to provide a method of forming tufted pile motor vehicle carpet which has selected areas of wear resistance and selected areas of decreased wear by providing predefined areas of different pile densities.

Another object of the invention is to provide a method of forming molded one-piece carpet module for a motor vehicle interior floor plan having pile of less density in one area than other areas of the floor plan.

Another object of the invention is to provide a method of forming a tufted molded carpet motor vehicle floor covering which presents a uniform appearance while requiring a reduced amount of pile yarn.

Another object of the invention is to provide a method of forming a molded carpet module for motor vehicles having multiple pile densities secured with a backing as single yarn tufts.

SUMMARY OF THE INVENTION

The above objectives are accomplished according to the invention by providing molded carpet modules for use as floor carpets in motor vehicles which are shaped in a three dimensional non-planar contoured configuration configured to fit within the body assembly of the automobile. The upper surface of the module comprises tufted pile yarns which have been tufted into a backing fabric with varying and prescribed pile densities. The varying densities are preferably between the front seat area and rear seat area, however in certain instances, the densities may also vary from side to side in the seat areas and in the cargo and luggage areas.

The pile yarns may comprise cut pile, loop pile, or cut and loop pile tufted loops of substantially equal length which extend through the backing fabric to a substantially uniform height. The density of the pile yarn forming the front seat area is greater than the density of the pile yarn forming the rear seat area, and the cargo/luggage areas. The densities are selected to provide a carpet having a uniform appearance, a luxurious feel in selected areas and a reduction of pile yarn used.

The invention is also directed to a tufted pile carpet which is adapted for use as floor carpeting for a motor vehicle. The tufted pile carpet is formed with pile tufts of equal height which are arranged over the backing fabric in at least two densities. The area having pile tufts arranged in a more dense pattern has pile yarns extending along three edges of the backing fabric. Likewise, the area having pile tufts arranged in a less dense pattern has pile yarns extending along three edges of the backing fabric.

The invention also includes the method of forming a pile carpet for use as carpeting for the interior passenger compartments of motor vehicles, and in certain instances, their associated cargo and/or luggage areas. The method includes selecting a backing fabric of a width substantially equal to the length or width of the passenger compartment. Designating substantially a first portion of the selected length or width of the backing fabric as the front seat area and designating a second portion of the length or width of the backing fabric as back seat area. Selecting a third portion of the length or width of the backing fabric as the cargo and/or luggage area when desired. Tufting pile forming yarn into the backing fabric so that the density of the pile for the cargo and/or luggage area is less than the pile for the rear seat area and the rear seat area is less than the density of the pile for the front seat area. Also tufting intermediate areas between the selected areas to have a density less than the rear seat area.

The method further includes selecting a portion of the front seat area and a portion of the rear seat area of the backing fabric to each have uniform pile of a first density throughout. Selecting the remaining portions of the front and rear seat areas of the backing fabric to each have uniform pile of a different density. Tufting each of these areas with pile yarn so that the front seat area and the rear seat area each have two or more densities of pile tufts.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
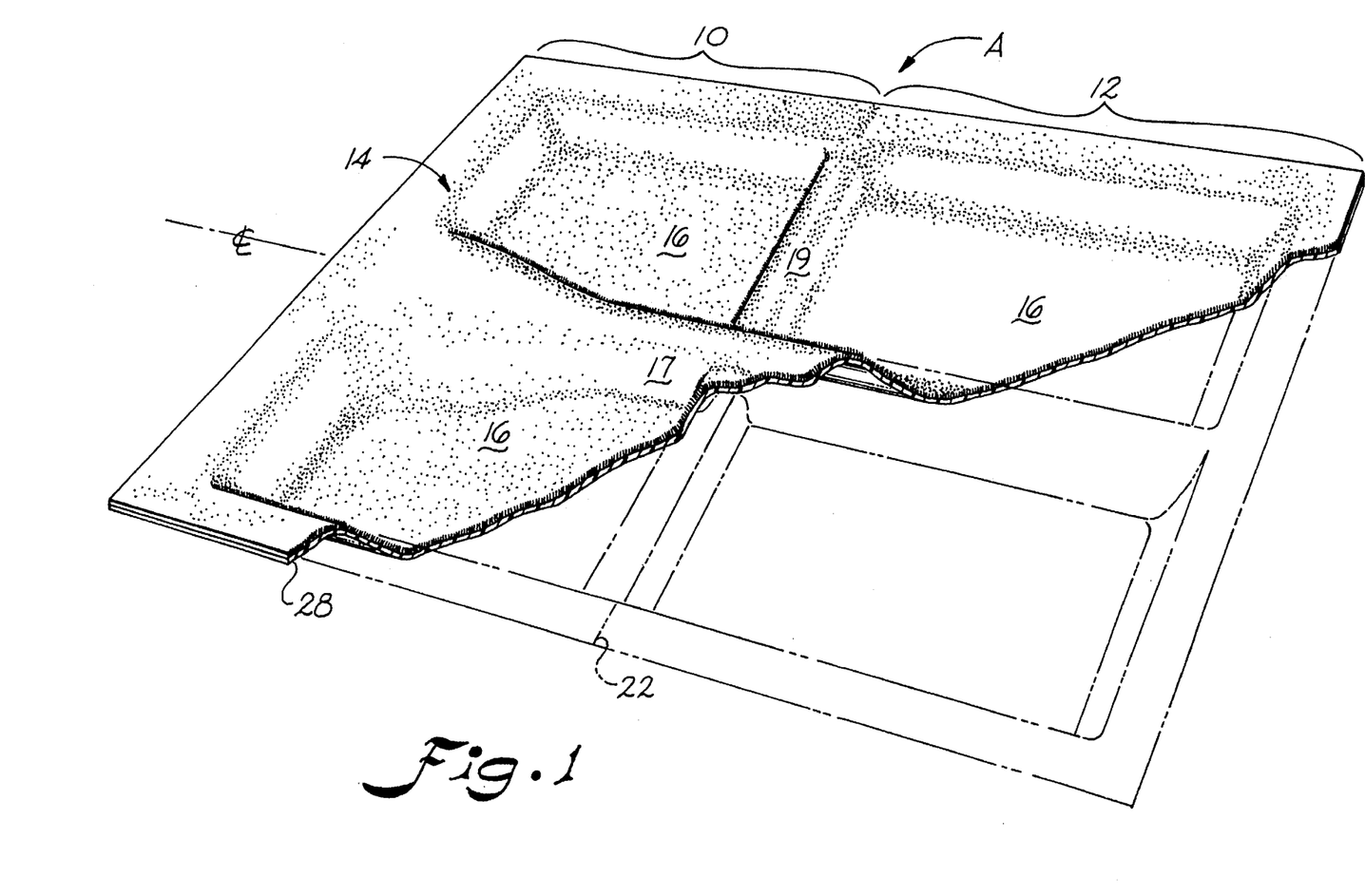
FIG. 1 is a schematic sectional perspective view of the molded carpet module of the invention.
Figure 2:
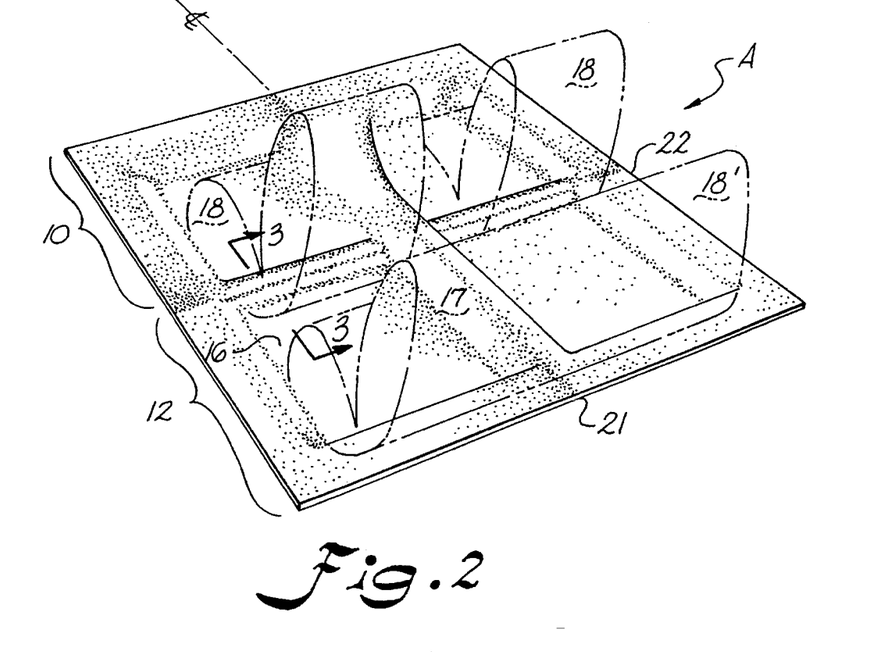
FIG. 2 is a schematic sectional view showing a carpet module shaped for an automobile interior.
Figure 3:
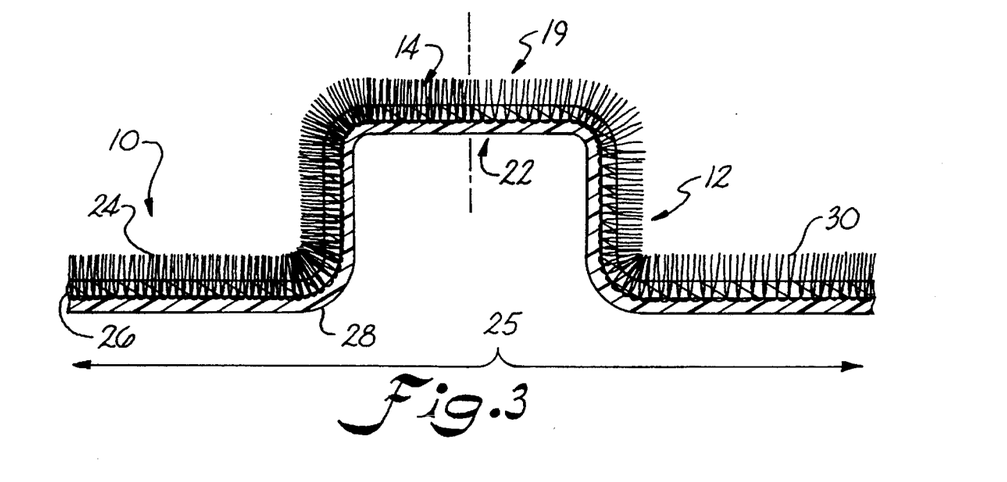
FIG. 3 is a sectional side view taken along lines 3—3 of FIG. 5.

Referring now to the drawings, the invention will now be described in more detail. There is shown a one-piece floor module A formed of a tufted pile carpet to which a back coating has been secured and which has been shaped to fit the interior configuration of a motor vehicle passenger compartment. The motor vehicle may be an automobile, a truck cab, a van, or a utility vehicle. The interior compartment may include the conventional front and rear seat floor areas as are usual in automobiles or it may also include the cargo/luggage compartment as in vans and station wagons. The interior of a utility vehicle such as a 4-wheel drive vehicle may include front and rear seat floor areas as well as the cargo area behind a rear seat. The interior of the van may include only a front seat floor area and cargo/luggage area or it may include front, intermediate and rear seat areas as well as the cargo/luggage area. As illustrated in FIGS. 1–3, module A has been divided into two sections; front section 10 and a rear section 12 corresponding to a typical automobile passenger compartment. Pile tufts 14 extend through backing 26 to cover the entire upper surface of the module with tufted pile yarn 40. Tufts 14 are preferably formed to a uniform height and are preferably of a single color.

The module, as shown in FIGS. 1 and 2, is shaped in a generally rectangular configuration in which four recessed areas 16 are formed. The recesses 16 are separated by transmission hump 17 extending longitudinally of module A and by at least one seat bar hump 19 extending transversely thereof. A perimeter edge area 21, which completely encircles module A, encloses the remaining two outer sides of recesses 16. Pile tufts 14 cover the entire upper surface area of the module.

It is understood that the invention is not limited to the particular configuration shown as the selected configuration is determined by the shape of the motor vehicle interior.

Normally, in use, module A is arranged to form fit the interior compartment of the automobile with a front section 10 provided to accommodate front seats 18 and a rear section 12 which accommodates rear seats 18'. As shown, front seats 18 are positioned to overlie transverse hump 19 while transmission hump 17 extends generally centrally of the seats. Rear seats 18' are normally arranged to overlie the rear edge of edge area 21. With the seats in this position, the passengers in the front seats will normally have their feet resting in recessed areas 16 of front section 10 and those in the rear seats will have their feet resting in recesses 16 of rear section 12.

A midsection line, designated 22 and shown best in FIG. 3, is arranged about midway of transverse hump 19 and is the point at which the pile yarn for the front seat section 10 may end, and the pile yarn for the rear seat section 12 may begin. Midsection line 22 and transverse hump 19 are located normally beneath front seats 18 generally in line with the door post of the automobile. It is to be understood, of course, that the transition zone may be a line or area elsewhere in relation to the front seat other than at the midsection. The important criteria being that the transition from one density to the other be located in a relatively unnoticed location. For this purpose, the floor carpet area designated generally as 25, under the front seat may be formed with a third density of tufted pile yarn which is even less than the rear floor areas (FIG. 3).

Referring now to FIG. 3, a section of module A is shown with pile tufts 14 extending through backing fabric 26 forming front tufts 24 over front section 10 and rear tufts 30 over rear section 12. Front and rear tufts 24, 30 are preferably a single type, color and size yarn formed to a single uniform tuft height. Front tufts 24 are arranged over area 10 in a more dense pattern than rear tufts 30 are arranged over area 12. The variation in the tufted pile density between front floor section 10 and rear floor section 12 may be between 20% to 50% (e.g. between 1 and 20 ounces per square yard) with the preferred variation being approximately 20% to 25%. For example, the front floor area may be 13 ounces per square yard, and the rear area may be 10 ounces per square yard. Pile tufts 14 may be cut pile, loop pile, or cut and loop pile mixed. Preferably, the tufts are formed of uniform density within each of the sections 10 and 12. Because center line 22 and seat hump 19 are normally located beneath front seats 18, it is typically difficult to notice any structural or coloration change between the more dense front pile tufts 24 and the less dense rear pile tufts 30.

A back coating 28 is molded with the underside of backing fabric 26. Back coating 28 acts to secure pile tufts 14 with the backing fabric and also to aid with the insulating properties required of module A. The back coating may be of the type disclosed in U.S. Pat. Nos. 3,953,632 or 4,579,764, or any other known and suitable back coating material such as polyethylene, EVA, latex, etc.

The backing fabric 26 is formed of any of the usual backing fabric materials and may be woven or spun bonded, or mechanically bonded. The most common backing fabric forming materials are polyester and polypropylene.

Figure 4:
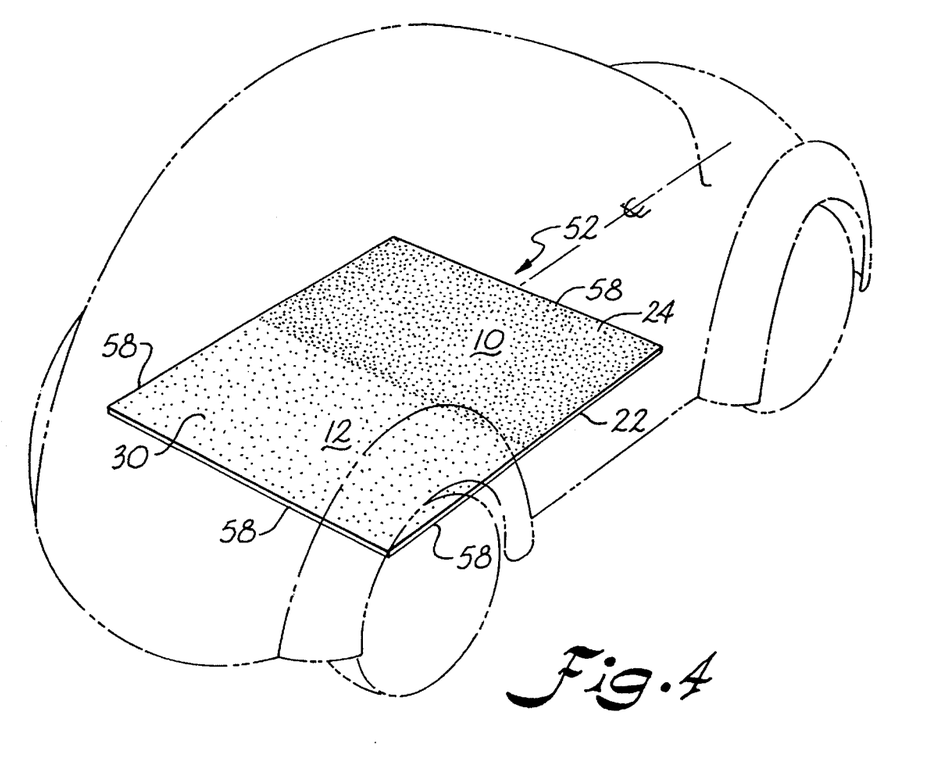
FIG. 4 is a schematic sectional perspective view showing a multi-density length of tufted carpeting.

FIG. 4 shows another embodiment for a tufted carpet 52 suitable for use as the floor carpeting for an automobile. The carpet is formed with a front section 10 in which the pile tufts 24 are arranged in a more dense pattern than are pile tufts 30 which cover rear section 12. Front tufts 24 extend over the entire area of front section 10 and are bounded by three of the four side edges 58 of carpet 52. Rear tufts 30 are similarly arranged. The transition line or area where the carpet changes from tufts 24 to 30 is located in the vicinity of the front seat. In this manner, the differences in densities goes unnoticed by passengers.

Figure 5:
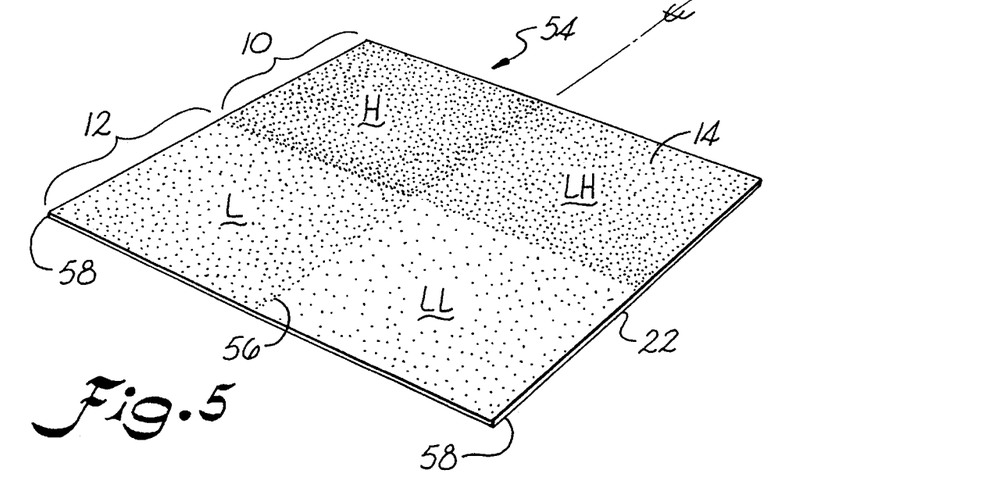
FIG. 5 is a schematic sectional perspective view showing a dual density length of tufted automobile carpeting.

FIG. 5 shows another embodiment of the invention where tufted automobile floor carpet 54 is divided between front section 10 and rear section 12. In this embodiment, front section 10 is formed with pile tufts 14 arranged in two densities, a high density designated H and a less high density designated LH. Rear section 12 which is also covered with pile yarn 14 is arranged in a low density designated L and a low, low density designated LL. Pile density H is arranged over the front driver side of the floor carpet while pile density LH is arranged over the front passenger side of the carpet. Rear section 10 is similarly arranged. The object of this embodiment is to provide the area of most wear with increased wearability while using progressively less pile yarn in the less used areas.

A molded module formed from this carpet would have the most dense pile in the area of the driver, the second most dense pile in the area of the passenger with the two lower dense areas being in the rear seat area. Other variations may also be provided to minimize the material used where not needed.

Figure 6:
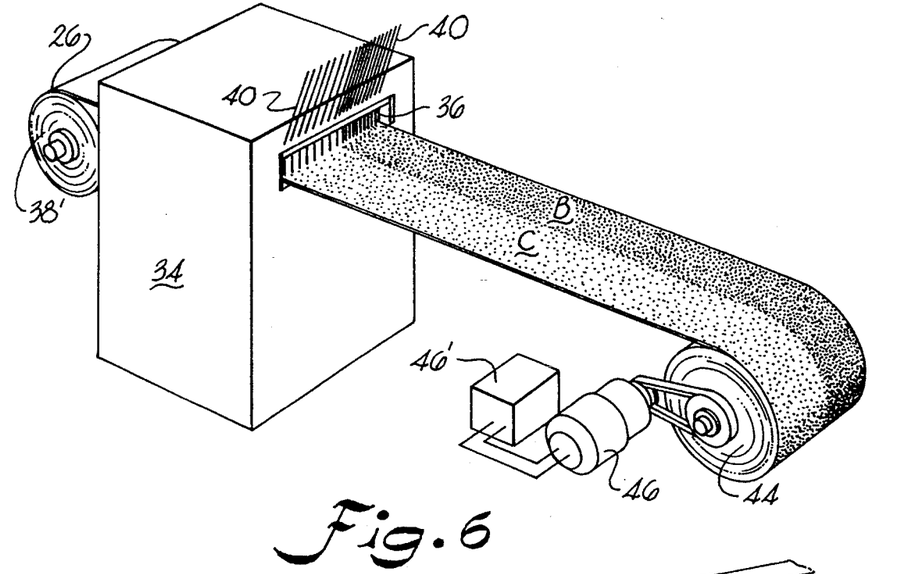
FIG. 6 is a schematic perspective view of the tufting process of the invention.
Figure 7:
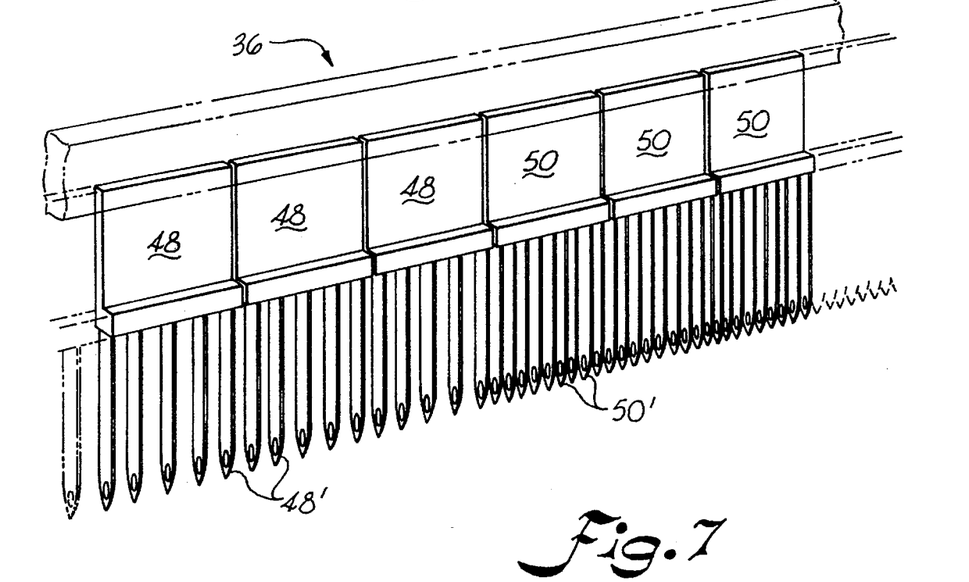
FIG. 7 is a schematic perspective view of the tufting needle bar arrangement according to the invention.

Referring now to FIGS. 6 and 7, a representation of a tufting machine is illustrated at 34. Backing fabric supply roll 38' delivers backing fabric 26 to the tufting machine where reciprocating needle bar 36 inserts pile yarn 40 through the back side of the backing fabric in the usual manner. Loopers, not shown engage and retain the loops formed by needles 48' and 50' of needle bar 36 below but on the face of backing fabric 26 where and cutters, also not shown, sever the loops and form pile tufts 14. The operation so far described, is usual and a more detailed description is not thought necessary.

The tufted backing fabric is drawn away from tufting machine 34 normally at a constant speed and wound onto take-up roll 44 by motor 46 controlled by control means 46'.

FIG. 6 shows backing fabric 26 emerging from tufting machine 34 with pile yarn 40 having been tufted therein in designated sections B and C. The pile tufts formed in section B (front floor) are arranged at a higher density than are the pile tufts in section C (rear floor). Each section may comprise substantially half of the width of the backing fabric in the event the carpet of FIGS. 1–4 is being formed. However, where the under seat area is a third density, a middle band of less dense tufted pile may be formed.

The needle arrangement for needle bar 36 for forming the carpet of FIGS. 1 and 4 is shown in detail in FIG. 7. The needle bar is formed to include a plurality of needle modules 48 and 50. The needles 48' of modules 48 are arranged at wider spacings along the mounting piece than are the needles 50' of modules 50. Modules 50 are arranged on needle bar 36 for a distance which equals the width of the area of more dense pile B and modules 48 are arranged over the remainder of the needle bar or over the less dense pile area C. This arrangement distributes the pile yarns 40 into the backing fabric in the desired areas at the desired densities. The apparatus functions with no unthreaded tufting needles which unnecessarily damage backing fabric 26 nor are there multiple yarns carried and inserted by a single needle which provides for less yarn control.

The tufted carpet formed the apparatus, so far described, is formed of a width equal to the length of the interior floor of the motor vehicle compartment. In use, the carpet roll 44 is cut to the desired width producing carpeting 52 designed for covering the floor area of the automobile compartment. It is noted that section B formed with the more dense tufted pile conforms with front section 10 and that section C formed with the less dense tufted pile conforms with rear section 12.

An alternative arrangement may comprise fitting needle bar 36 with only one of modules 48 or 50 providing that all of the needles are equally spaced. The tufting operation utilizing this arrangement would otherwise continue as shown in FIG. 5 with backing fabric 26 passing through tufting machine 34 to be tufted with pile forming yarns 40 forming pile of equal density across its width.

Control 46' would be operated to control the speed of motor 46 between two, three, four or more speeds, each speed corresponding to a section such as sections 10, 12 and in FIGS. 2 and 3. The faster motor 46 is driven, the faster backing fabric 26 is drawn past needle bar 36 which results in less pile yarn 40 being tufted into a given length of the backing fabric. Conversely, the slower motor 46 is driven, the slower backing fabric 26 moves past needle bar 36, and the more pile yarn 40 tufted into a given area.

Control 40' may control motor 46 to form a high density front seat floor section, a low density intervening section beneath the seat, an intermediate density back seat floor section and a low density second intermediate and cargo/luggage section. Of course, the cargo/luggage section may have a pile density higher or lower than that of the intermediate area. This method of tufting the variably density pile carpet makes it possible to form a carpet having an unlimited length and is particularly useful when forming flooring carpet for long vehicles such as vans, station wagons and utility vehicles.

Tufted carpet 52 formed by either method may subsequently be molded, in which case it would conform with module A shown in FIG. 1.

Normally nylon pile yarn 40 consists of nylon bulk continuous filament in the denier range of between 300 total denier and 4000 total denier. Pile yarn 40 could also be formed as a spun staple yarn in the range of between 10 singles cotton count and 1 singles cotton count. Also the pile yarn could be plied and heatset. Other materials such as polyesters, polypropylenes or acrylics could be used. The pile yarn is tufted into backing fabric 26 to form a pile density which ranges between 5 and 30 ounces per square yard. Pile yarn 40 extends through backing fabric 26 to form pile tufts 14 which are from between ¼ inch and 1 and ½ inches in length.

Figure 8:
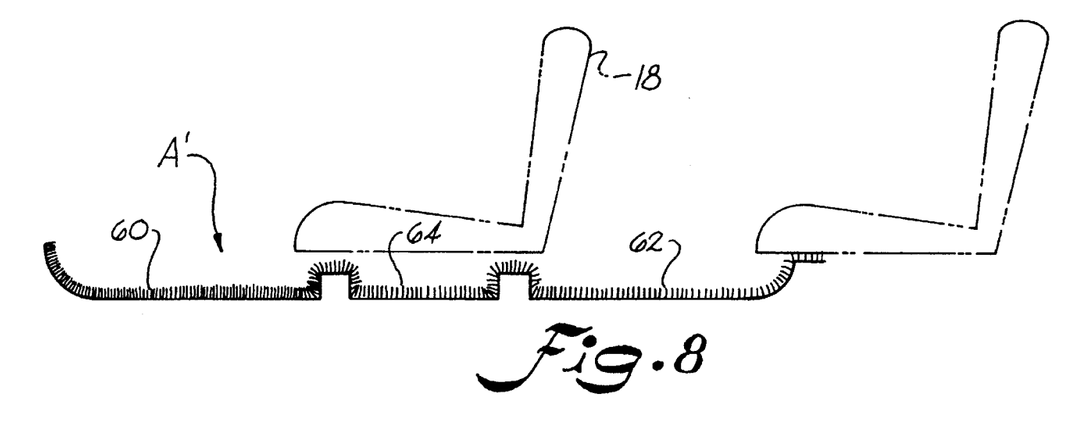
FIG. 8 is a schematic sectional view of a commercial floor plan for automobile carpet according to the invention.
Figure 9:
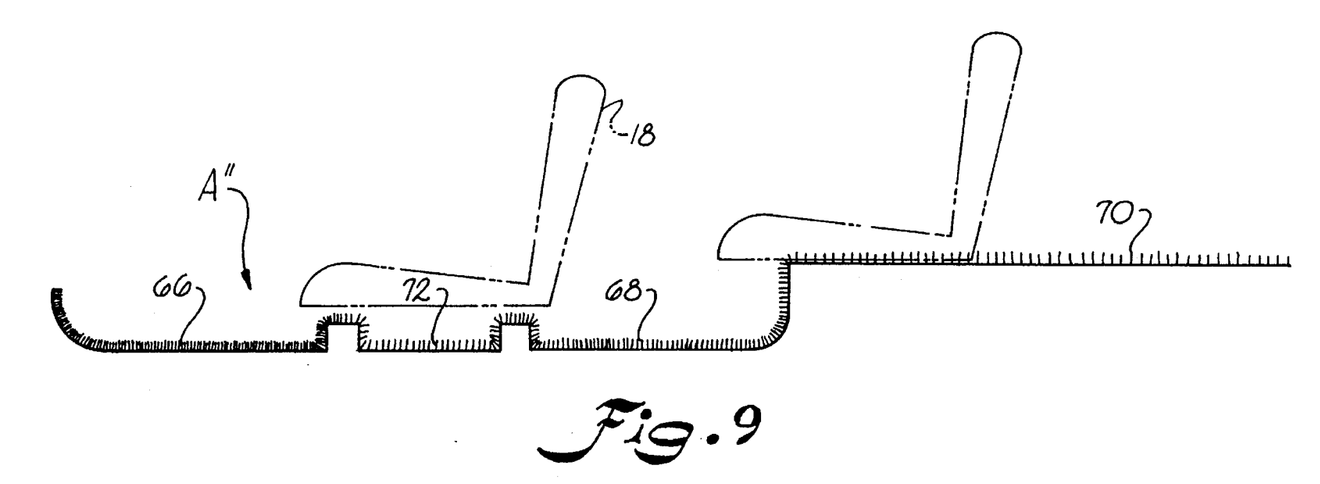
FIG. 9 is a schematic sectional view of a commercial floor plan for utility vehicle carpet according to the invention.

Referring now to FIGS. 8 and 9, commercial applications of the present invention will be described. FIG. 8 is a schematic illustration of a commercial floor plan for the passenger compartment of an automobile incorporating multi-density floor carpeting according to the invention. FIG. 9 is a schematic illustration of a commercial floor plan for the passenger compartment of a utility vehicle having multi-density carpet constructed according to the invention.

In FIG. 8, a molded, one-piece carpet module, designated generally as A', is illustrated which includes a laminated construction as illustrated in FIG. 3. Tufted pile carpet 60 in the front floor area has a first pile density. Tufted pile carpet 62 in the rear floor area behind front seat 18 has a second pile density. Tufted pile carpet 64 in an area underneath front seat 18 may have yet a third pile density. Preferably, the density of the pile in tufted pile carpet 60 is greater than the pile density of pile carpet 62. The third density of pile carpet 64 may be less than the first and second pile density of carpet 60 and 62.

As can best be seen in FIG. 9, a commercial floor plan for a utility vehicle is illustrated wherein a one-piece carpet module A" has been constructed according to the invention. A carpet module includes a tufted pile carpet 66 in the front floor area having a first pile density. There is tufted pile carpet 68 in the rear floor area having a second pile density. There is a tufted pile carpet 70 in the cargo area which has a third pile density. Preferably, there is also a tufted pile carpet 72 underneath front seat 18 which has a fourth pile density. In the illustrated embodiment, the first pile density of carpet 66 may be greater than the second pile density of carpet 68. The third pile density of carpet 70 may be less than either of the first and second pile densities of carpet 66 and 68. The pile density of carpet 72, underneath seat 18, may be greater than pile density of carpet 70, or may be less.

Any variation of the pile densities may be had according to the invention depending upon the amount of wear received by the particular area, and the economics of the application being made. Module A" may also have a laminated construction and a pre-molded configuration as in the embodiments illustrated in FIGS. 2 and 3.

While a preferred embodiment of the invention has been described using specific terms, such description is for illustrative purposes only, and it is to be understood that changes and variations may be made without departing from the spirit or scope of the following claims.

What is claimed is:

1. A method of forming a pile carpet for use as an original carpet floor of a motor vehicle body assembly; said vehicle body assembly having a front seat for accommodating passengers and a rear seat disposed behind said front seat for accommodating passengers; an interior vehicle floor which includes an area forward of said front seat which extends rearwardly to an area forward of said rear seat to define a front floor area located in front of said front seat and a rear floor area located in front of said rear seat, and behind said front seat; and said front and rear floor areas extending generally between spaced sidewalls of said vehicle assembly; said method comprising:

providing a backing fabric having one dimension substantially equal the length of said interior vehicle floor;

tufting pile forming yarn into said backing fabric in a first yarn density to form a front floor carpet section of said pile carpet which corresponds to said front floor area of said vehicle interior floor;

tufting pile forming yarn into said backing fabric in a second yarn density to form a rear floor carpet section of said pile carpet which corresponds to said rear floor area of said vehicle interior floor;

tufting said carpet sections so that said second yarn density of said rear floor carpet section is less than said first yarn density of said front floor section; and selecting said first and second yarn densities in accordance with varying passenger traffic in each said carpet section and in a manner that said varying yarn densities are relatively unnoticeable so that an economical carpeted vehicle floor is provided without sacrificing wearability and aesthetic appearances.

2. The method of claim 1 wherein said vehicle body assembly includes a cargo area behind said rear seat, said method including tufting pile forming yarn into said backing fabric to form a cargo carpet section having a pile density different from the pile density of said rear floor carpet section.

3. The method of claim 1 including tufting said carpet floor section so that said first yarn density of said pile yarn is less on a first side than a second side and said second yarn density of said pile yarn is less on said first side than said second side, whereby said rear floor and said front floor carpet sections comprise pile yarn tufted at four densities.

4. The method of claim 1 including tufting said pile yarn forming yarn into said backing fabric to form a transition carpet section of said pile carpet between said front floor carpet section and said rear floor carpet section which has a lesser pile density than said front and rear floor carpet sections.

5. The method of claim 1 wherein said interior vehicle floor includes a luggage/cargo section which extends rearwardly of said rear seat; said method including tufting pile forming yarn into said backing fabric in a third yarn density which is less than said first yarn density to form pile carpet which corresponds to said luggage/cargo area.

6. The method of claim 5 wherein said interior vehicle floor includes a transition zone between said rear floor area and said luggage/cargo section; said method including tufting pile forming yarn into said backing fabric in a fourth yarn density which is less than said second yarn density to form pile carpet which corresponds to said transition zone.

7. The method of claim 6 wherein said interior vehicle floor includes a transition zone between said front floor area and said rear floor area; said method including tufting pile forming yarn into said backing in said fourth yarn density to form pile carpet which corresponds to said transition zone.

8. The method of claim 7 including selecting said fourth yarn density and said third yarn density to be the same.

9. The method of claim 7 including selecting said fourth yarn density to be less than said third yarn density.

10. The method of claim 1 including providing that said one dimension of said backing fabric extends in its widthwise direction.

11. The method of claim 1 including providing that said one dimension of said backing fabric extends in its lengthwise direction.

12. The method of claim 1 including cutting said backing fabric to substantially equal each of the length and width of said interior vehicle floor.

13. The method of claim 1 including applying a backing coating with said backing fabric and curing said backing coating.

14. A method of forming a molded carpet module shaped in a three dimensional non-planar contoured configuration for forming an original carpeted floor of a motor vehicle body assembly, said vehicle body assembly having at least one front seat for accommodating occupants and a rear seat for accommodating occupants disposed behind said front seat; and an interior vehicle floor extending from an area forward of said front seat rearwardly to an area forward of said rear seat to define a front seat floor area located inn front of said front seat and a rear seat floor area located in front of said rear seat and behind said front seat, and said front seat and rear seat floor areas extending generally between spaced body sides of said vehicle assembly wherein said method comprises:

providing a backing fabric having one dimension substantially equal the length of said vehicle floor and a second dimension substantially equal the width of said vehicle floor;

tufting pile forming yarn into said backing fabric to appear on a first side thereof in a first yarn density to form a front floor carpet section of said pile carpet which corresponds to said front floor area of said vehicle floor;

tufting pile forming yarn into said backing fabric to appear on said first side in a second yarn density to form a rear floor carpet section of said pile carpet which corresponds to said rear floor area of said vehicle interior floor;

tufting said carpet sections so that said second yarn density of said rear floor section is less than said first yarn density of said front floor section;

said first and second densities being selected so that first and second module sections of said carpet module are provided with yarn densities varied in accordance with passenger traffic but without descernable yarn density differences between said front and rear seat floor areas to provide a more economical original carpeted vehicle floor;

securing a synthetic coating to a second side of said backing fabric opposite said first side, forming a coated and pile tufted carpet; and molding said coated and pile tufted carpet to form said molded carpet module.

15. The method of claim 14 wherein said vehicle body assembly includes a cargo/luggage area behind said rear seat, said method including tufting pile forming yarn into said backing fabric to form a cargo/luggage section having a pile density different from the pile density of said rear floor carpet section.

16. The method of claim 14 wherein said vehicle body assembly includes a transition area beneath at least said front seat, said method including tufting pile forming yarn into said backing fabric to form at least a transition area having a pile density different from the pile density of said rear floor carpet section.

17. The method of claim 16 wherein said vehicle body assembly includes a cargo/luggage area behind said front seat, said method including tufting pile forming yarn into said backing fabric to form a cargo/luggage section having a pile density different from the pile density of said transition area.

18. The method of claim 14 including selecting said synthetic coating from one of polyurethane, polyethylene, formaldehyde, and latex resins.

* * * * *